US006695260B2

United States Patent
Castiel et al.

(10) Patent No.: US 6,695,260 B2
(45) Date of Patent: Feb. 24, 2004

(54) VIRTUALLY GEOSTATIONARY SATELLITE ARRAY

(75) Inventors: David Castiel, Washington, DC (US); Jay Brosius, Frederick, MD (US)

(73) Assignee: Virtual Geosatellite LLC, Washington, DC (US)

( * ) Notice: Subject to any disclaimer, the term of this patent is extended or adjusted under 35 U.S.C. 154(b) by 0 days.

(21) Appl. No.: 09/777,624

(22) Filed: Feb. 5, 2001

(65) Prior Publication Data

US 2002/0017593 A1 Feb. 14, 2002

Related U.S. Application Data

(60) Provisional application No. 60/180,025, filed on Feb. 3, 2000.

(51) Int. Cl.[7] .................................................. B64G 1/10
(52) U.S. Cl. ............................... 244/158 R; 455/12.1; 342/352
(58) Field of Search ................ 244/158 R; 342/252, 342/358, 359; 455/12.1, 11.1, 13.1, 13.2

(56) References Cited

U.S. PATENT DOCUMENTS

| 4,502,051 A | | 2/1985 | Dondl |
|---|---|---|---|
| 4,827,421 A | * | 5/1989 | Dondl ........................ 364/459 |
| 4,854,527 A | * | 8/1989 | Draim .................... 244/158 R |
| 5,439,190 A | | 8/1995 | Horstein et al. |
| 5,788,187 A | | 8/1998 | Castiel et al. |
| 5,845,206 A | * | 12/1998 | Castiel et al. .............. 455/13.4 |
| 5,871,181 A | * | 2/1999 | Mass ...................... 244/158 R |
| 5,931,417 A | | 8/1999 | Castiel |
| 5,957,409 A | | 9/1999 | Castiel et al. |
| 6,102,335 A | | 8/2000 | Castiel et al. |
| 6,122,596 A | | 9/2000 | Castiel |
| 6,327,523 B2 | * | 12/2001 | Cellier ........................ 701/13 |
| 6,328,264 B1 | * | 12/2001 | Maeda et al. ........... 244/158 R |
| 2001/0041950 A1 | * | 11/2001 | Cellier ........................ 701/13 |
| 2001/0045494 A1 | * | 11/2001 | Higgins .................. 244/158 R |

* cited by examiner

*Primary Examiner*—Michael J. Carone
*Assistant Examiner*—Gabriel S Sukman
(74) *Attorney, Agent, or Firm*—Fish & Richardson P.C.

(57) ABSTRACT

An array of satellites virtual forming a geosynchronous space. Communication with the satellites is only carried out during an active arc near the apogee portion. During other points of the satellites orbit, they are inactive. These inactive portions of the satellites orbit include the positions where the satellite communication could conceivably interfere with communications to geosynchronous satellites.

24 Claims, 8 Drawing Sheets

VIRTUALLY GEOSTATIONARY SATELLITE ARRAY

This invention claims priority under 35 U.S.C.119/120 from provisional application Ser. No. 60/180,025 filed Feb. 3, 2000.

BACKGROUND

Satellites in geostationary orbits are at virtually the same location relative to the earth, at points and times in the earth's rotation. Geosynchronous orbits require specified parameters (22,300 miles; 0° inclination) to make this work. Hence there is only one orbital track or "orbit" which can be used for a geosynchronous satellite. Within that orbit, there are only a limited number of available geostationary slots. However, the demand for satellite space increases in line with the demand for bandwidth. In recent years, demand for bandwidth has been increasing exponentially.

The arrangement that has been adopted over time uses multiple slots within the single ground track orbit, each slot having approximately 2 degrees of width relative to an earth-centered angle. This allows for communications with a minimum of electronic interference using directed antennae. The geo ring around the equator hence has a total of 180 slots (360 degrees divided by 2 degrees).

There are a limited number of geosynchronous slots that remain available.

SUMMARY

The present invention teaches an array of virtually geostationary satellites which address this problem, and provides a totally new area for a plurality of satellites in new slots. These new slots have many of the advantages of geostationary orbits.

A new geo like space called the virtual geo space is disclosed according to the present invention. This provides new real estate in the satellite sector.

The space includes a plurality of satellites in elliptical orbits, which satellites are active during an "active arc" occurring during their apogee portions. Multiple satellites can be placed in each orbit to trace the same ground track. The same number of satellites, at least one, is in the active arc apogee portions at any one time.

For example, In one preferred embodiment, the design creates twelve active "arcs", the portion of its orbit in which the satellite is active, each accounting for sixty percent of an orbital period. Each active arc remains stationary over a specified region of the earth indefinitely, through which satellites move slowly, or appear to loiter.

In an embodiment, no active arc crosses any other active arc, and all portions of all active arcs remain separated by at least 40 degrees from the geostationary orbit as seen from any vantage point on earth at all times. The active arcs themselves are geostationary, and together form a satellite assignment space having advantageous non-interference characteristics as the traditional geostationary orbit. It may be possible to create more than 150 satellite assignment slots mutually separated by two degrees or more. The two degrees may be a separation figure in common use in the geostationary orbit over the Western Hemisphere within this space of active arcs.

BRIEF DESCRIPTION OF THE DRAWINGS

These and other aspects of the invention will be described in detail with reference to the accompanying drawings, wherein.

DETAILED DESCRIPTION

Figure 1:
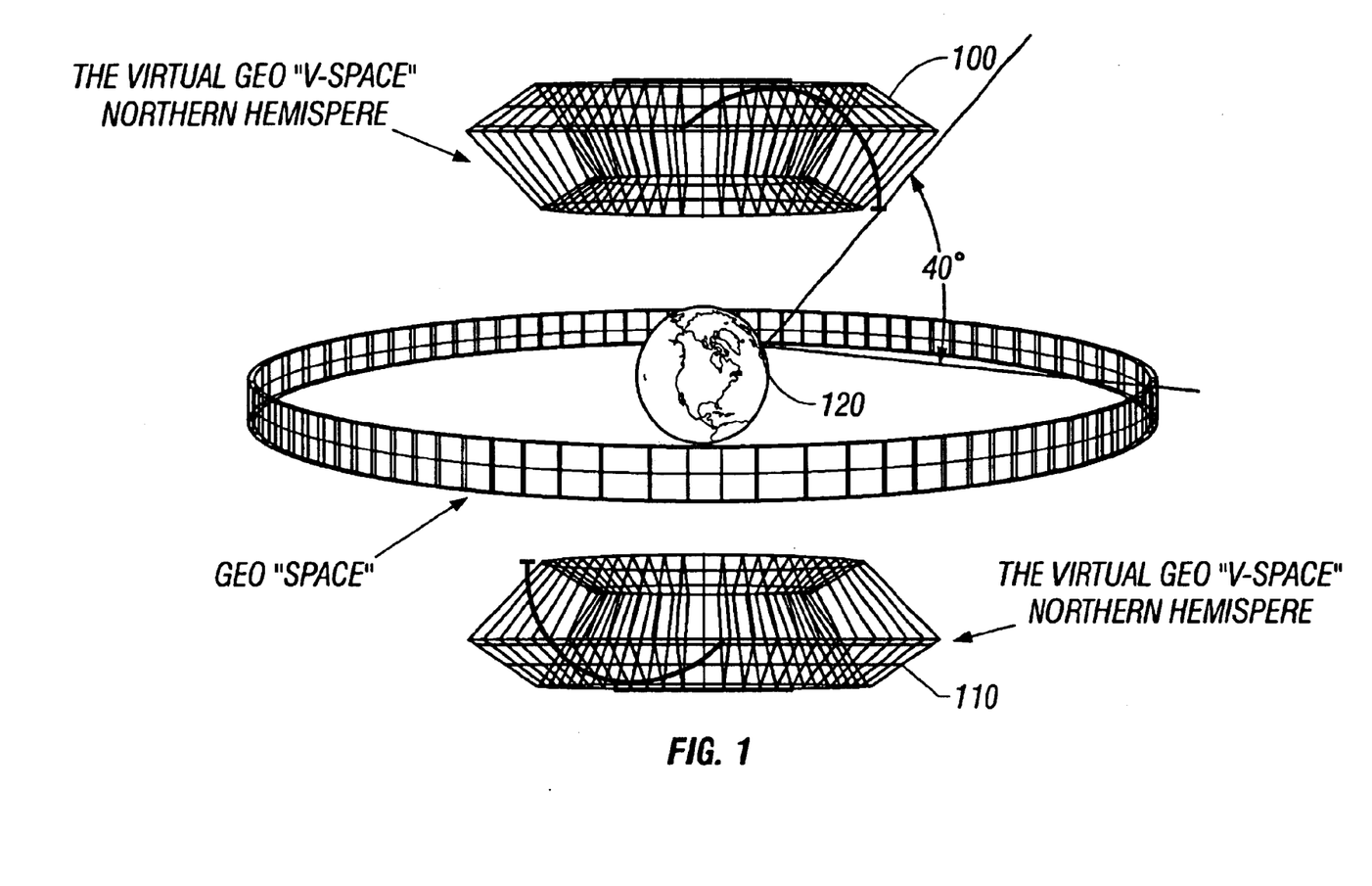
FIGS. 1 and 2 show the orbits and orbital space of the satellite array of the present application.
Figure 2:
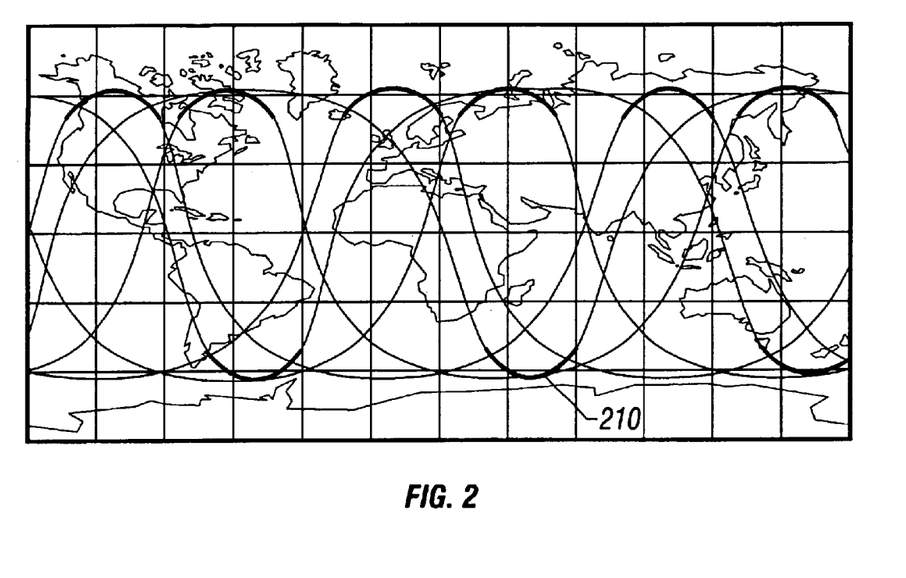

FIGS. 1 and 2 show the orbits and orbital space of the satellite array of the present application. Each of a plurality of satellites are placed into elliptical orbits of a special type. The preferred orbits are inclined at inclination of around 63 degrees, e.g., 63.435 or 116.565 degrees. The satellites are posigrade, elliptical orbits having three revolutions per sidereal day.

The argument of perigee refers to the location of the lowest altitide portion of the orbit around the orbit from the point in the orbit where the orbiting satellite crosses the equator in a northward direction. The orbits preferably have an argument of perigee of near 270 or ninety degrees, which has the effect of placing the apogee or highest point of the orbit over the northern-most or southern-most portion of the orbit respectively.

The orbits also have an eccentricity of around 0.65 to 0.66.

The satellite may also have an apogee altitude of 26,967.6 km, perigee altitude of 798.3 km, argument of perigee at or near 270 or 90 degrees, eccentricity of about 0.66, altitude over the equator of approximately 5430.6 km, altitude at start and end of the active arcs of 17,787.7 km, 45.1 degrees (north or south) latitude at start and end of the active arce, and nominal latitude of 63.435 degrees. The orbit semi major axis is approximately 20250–20230 km.

Orbits having an integer number of revolutions per day will have a ground track that passes over the same points on the earth every (sidereal) day. Such ground tracks are referred to in this specification as repeating ground tracks.

The satellites are only active during part of their time of orbit. The time when the satellites are active is referred to as active arcs. The active arcs are defined to be around the orbital apogee, where the satellites travel most slowly. This maximizes the time that a satellite spends in the active arc. In this embodiment, each earth communicating satellite remains in each active arc for 4.8 hours. After leaving the active arc, each earth communicating satellite becomes inactive and non-radiating, and spends 3.2 hours transiting to its next active arc. The satellite then enters another active arc and begins communications again. This means that each satellite is active for 4.8/(4.8+3.2)≈60% of the time.

Each of the satellites include communication equipment which communicates with corresponding communication equipment located on the earth. Therefore, the satellites may communicate with various points on the earth.

Near apogee, where the satellite's progress slows, its motion almost matches the rotational speed of the earth. Therefore the Earth-communicating satellites in the active arcs will therefore appear to hang, or loiter over the earth. Since the argument of perigees are at the southern-or northern-most ends of the orbits, the active arcs straddle the apogees, and the corresponding active portions of the ground tracks, are hence displaced at a large angle to the North or South respectively from the equator and the geostationary orbit.

A first set of satellites have apogees in the Northern Hemisphere forming the space 100. Those satellites are also shown in the ground track map of FIG. 2, with their respective apogees 200 shown being bolded in FIG. 2. A second set of satellites has apogees in the Southern Hemisphere forming the space 110.

Two ground tracks are illustrated having active arcs in the Northern Hemisphere, and one ground track is illustrated having active arcs in the Southern Hemisphere.

FIG. 2 shows the active parts of the arc in bold. While the satellites are in these active parts of the arc, they have a similar rotational rate relative to the earth, and move very little relative to the earth. The space in which these apogees occur moves at a similar rotational rate to the Earth, thus becoming the "virtual geostationary space", in which active arcs derived from virtual geosationary orbits, lay.

The virtual space may therefore include a plurality of satellites, each of which is in a highly elliptical orbit with its apogee over a Hemisphere, either the Northern or Southern Hemisphere.

In the embodiment disclosed herein, the satellite is active over substantially 4.8 hours (e.g. 4.8 hours $\mp 10$ percent) out of every 8 hour orbit, this orbit repeating itself 3 times per day (24 hour day) and defining a repeating ground track. More generally, each of the satellites is active for substantially 60 percent of the time it is in orbit, but more generally can be active within 45 and 80 percent of the time that it is in orbit.

Figure 3:
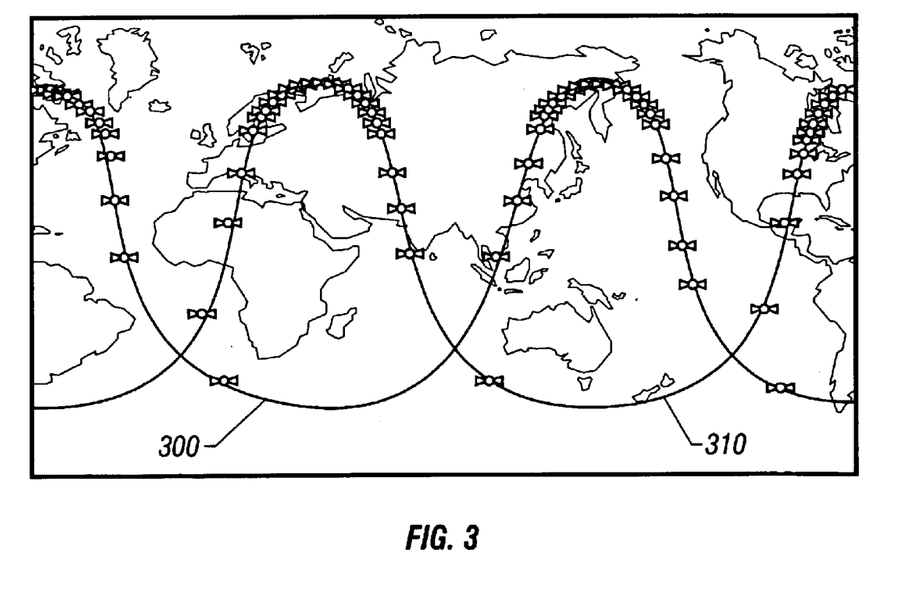
FIG. 3 shows multiple satellites in a ground track.

Several satellites may occupy the same ground track, such as 210. The satellites in the single ground track are timed so that as soon as one satellite leaves each active arc of the ground track, another enters that active arc. Each ground track has three active arcs around the earth, and, if continuous coverage is desired, enough satellites are placed in the ground track, spaced evenly in time, so that there is always one satellite in each active arc per system. For example, FIG. 3 shows 72 satellites in each ground track 300, 310. The active arc includes the top part of the curve. FIG. 3 shows how the satellites bunch up in this area, and that there are relatively fewer satellites in the other, non-active, areas. The satellites are preferably placed within the active arc in a way such that there is at least one satellite in each active arc per system at all times, but preferably more than one.

With these parameters, a ground track with three active arcs provides a coverage of substantially three times fifty degrees of longitude, or 150 degrees of longitude. A second ground track may be interleaved to create a second set of active arcs in the Northern Hemisphere to thereby provide another 150 degrees of occupied longitude. This provides a total of 300 degrees of longitude occupied by the active arcs (or less if the two ground tracks overlap in areas of high demand for example). The active arcs may be placed, as shown, to maximize the viewing angles to Continental areas.

The satellites tend to bunch up at the regions near apogee since this is the time when the satellites move the most slowly. FIG. 3 shows this effect, with most of the satellites being bunched at the apogee areas. However, if the satellites are placed in this way, as described herein, their ground tracks will not cross one another during their active periods. If two groups of satellites are displaced by 45 degrees from one another as in FIG. 2, the satellites appear as six, distinct, parabolic shaped active arcs in the Northern Hemisphere on a Cartesian map. Six active arcs in the Southern Hemisphere could also be used. The active arcs in the Southern Hemisphere could be the inverse of the Northern Hemisphere active arcs.

Since the satellites are only communicating near apogee-active arcs, these create the virtual Geo space as shown in FIG. 1. The satellites actually trace a complete path which is not shown in FIG. 1. However, the space 100 is formed only by the active arcs of the satellites. The satellites actually travel in other positions besides these active arcs, but communicate only within these active arcs.

Multiple earth communicating satellite systems may use the same active arcs disclosed above, to place its earth communicating satellites in the same ground tracks as above. However, this system times the entry of its satellites to differ from those of other systems by at least $t_\theta$, where $\theta$ is the minimum separation desired in the active arc occurring at apogee, and $t_\theta$ is the time necessary for a satellite to move that distance at that location.

Table 1 summarizes some exemplary slot parameters.

TABLE 1

Mathematical Relationships between Desired Orbital Separation Angle, Relative Mean Anomaly, and Relative Right Ascension

| Satellite Separation, Earth Central Angle | Satellite Separation, Relative Mean Anomaly between a leading and following satellite in a ground track | Relative Right Ascension |
| --- | --- | --- |
| $\theta$ | $-360(t_\theta/P)$ (following relative to leading) | $360(t_\theta/86,400)$ (following relative to leading) |
|  | (following satellite has lower value) | (following satellite's orbit has higher RAAN) |

Where: RMA is relative mean anomaly or Mean Anomaly difference between two satellites in degrees relative to a common epoch (reference time), as measured in each respective orbit, Relative Right Ascension is the difference in degrees between the RAANs of two orbits, $t_\theta$ is the time required to move $\theta$ degrees true anomaly at apogee in seconds, P is satellite orbital Period in seconds The table provides mathematical relationships between Right Ascension of the Ascending Node and Mean Anomaly for satellites flying in the same ground track, but separated by a minimum of $\theta$ degrees earth central angle. Each entry time differing from its neighbor by $t_\theta$ constitutes a slot in the active arc. Each satellite in each active arc occupies one slot in that arc. A "protected" interval may exist around the satellite which travels with the satellite. In a geostationary orbit, a slot is defined by the longitude of the point on the earth under it. In this virtual geostationary orbit, a slot is defined as an active arc entry time stated for a specified epoch day. Ground tracks and active arcs may be created, with one satellite in each active arc at all desired times.

The orbital parameters described above may be varied somewhat while still preserving the characteristic of stationary active arcs over the northern or southern hemisphere. However, all satellites to be slotted together into active arcs in a coordinated fashion using this scheme may agree to use at least the same Mean Motion, eccentricity, inclination, argument of perigee, and ground track. The right ascension of the ascending node and mean anomaly of each satellite are preferably also adjusted together in order to place the satellite on the specified ground track at the satellite's specified time of active arc entry. This yields a coordinated motion among all such satellites where minimum separation criteria among them can be guaranteed.

Orbital parameters are adjusted to create ground tracks that repeat daily. In this preferred embodiment, each ground track has three active arcs in the Northern Hemisphere. Each active arc spans around 50 degrees of longitude at the highest portion of the orbit. All three active arcs therefore occupy around 150 degrees of longitude.

A second ground track interleaved with the first creates a second set of active arcs in the Northern Hemisphere accounting for another 150 degrees of occupied longitude, for a total of 300 degrees of longitude occupied by active arcs. The two ground tracks are spaced so as to maintain a minimum separation between all active arcs (distributing the remaining 60 degrees of longitude as spacing) while providing optimum position and coverage characteristics for the active arcs. Active arcs can be freely placed to maximize viewing angles to desired service areas.

This process is repeated in the Southern Hemisphere using orbital arguments of perigee of around 90 degrees.

Figure 11:
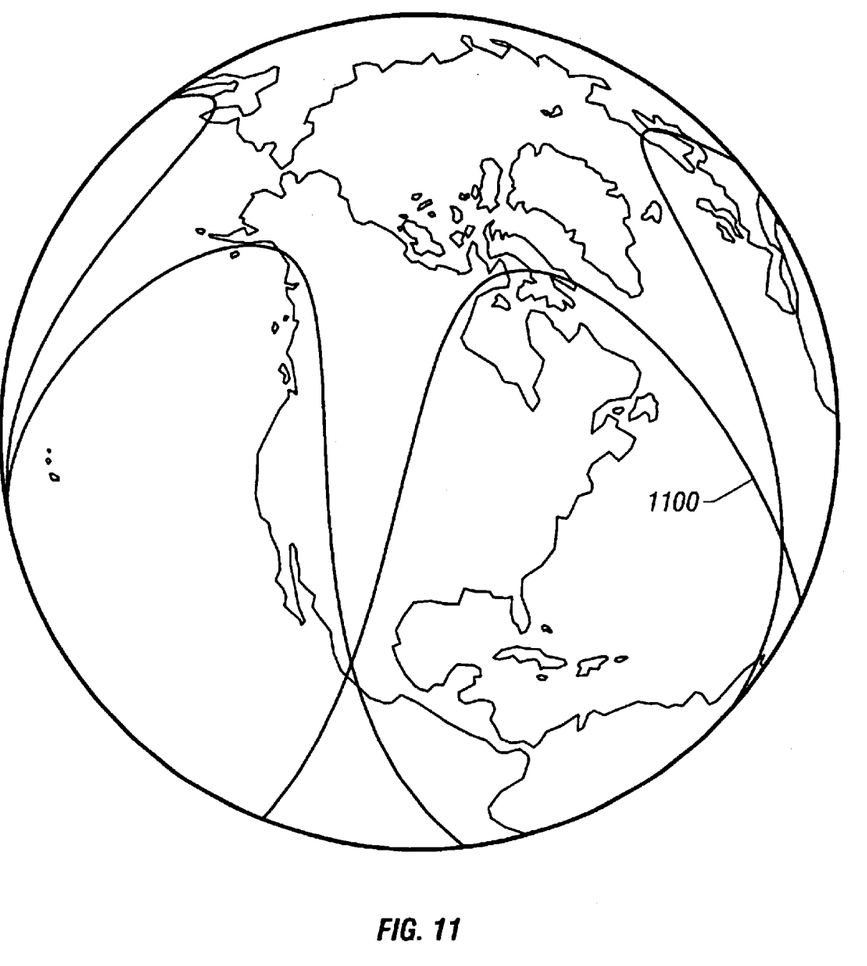
FIG. 11 shows the view as it would be seen from earth from one satellite.

Since earth communicating satellites using these active arcs are in orbit at over 17,000 to over 27,000 km, from these high vantage points each satellite in an active arc can see ground area encompassing several active arcs. FIG. 11, for example, shows a satellite earth view and ground track 1100 for a single satellite, with its apogee over North America.

In order to place multiple satellites onto the same ground track passing at spaced time intervals, the planes of the orbit of following satellites may be rotated about the earth's axis by the amount and in the direction the earth has rotated in the interval between the times the satellites pass over a given point. Larger time intervals between satellites in a ground track may cause more orbital rotation of the following satellite about the earth's axis to keep the satellite over the same ground track. This angle, when measured relative to a celestial reference point, e.g., the position of the sun against the backgrop of stars at the time of the Vernal Equinox, is known as the orbit's right ascension of the ascending node (RAAN). If all satellites moved in the same orbit, rather than orbits that have been adjusted for earth rotation, following satellites would travel in ground tracks further to the west of those of the preceding satellite, since the surface of the earth is constantly moving around to the east relative to the stars. Hence to follow a common ground track and share active arcs, each satellite should occupy its own orbit having its own RAAN.

Figure 4:
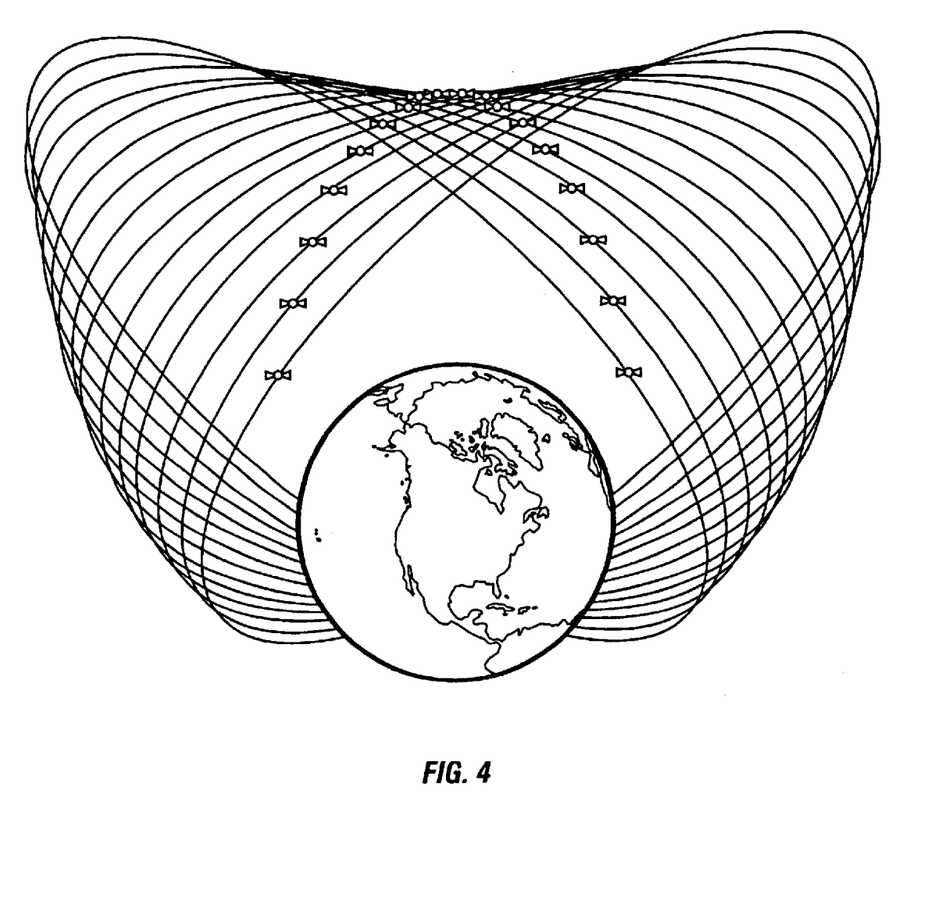
FIG. 4 shows separate satellites in separate slots in active orbits.

FIG. 4 illustrates the satellites occupying successive slots in one active arc and the separate orbits and relative positions in orbits which allow each satellite to follow the active arc properly.

Spacing in space can be assured by ensuring a constant separation of the points in the ground tracks under each satellite, and if necessary adjusting orbits to ensure differing altitudes at ground track crossings.

Figure 5:
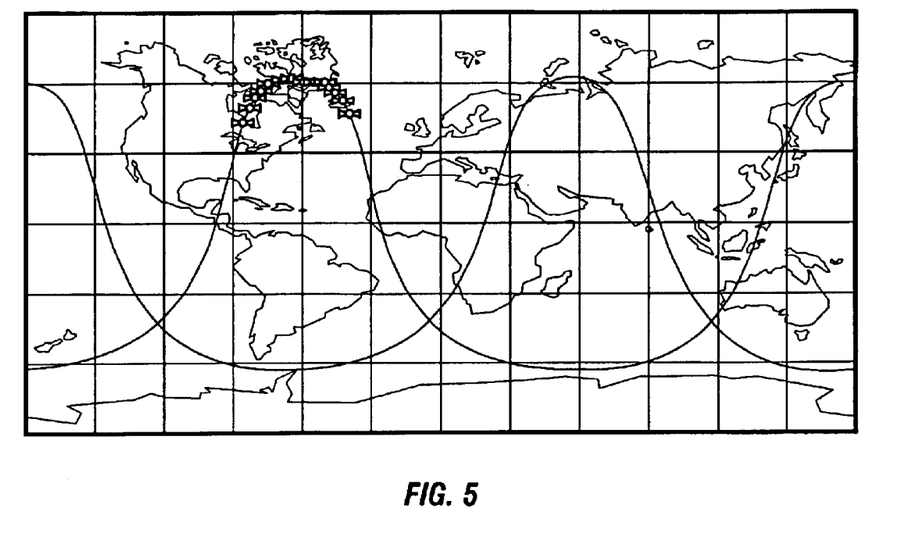
FIG. 5 shows the positions of those satellites in the active arc of the orbit.

FIG. 5 illustrates the relative positions of the satellites shown in FIG. 4 within one active arc of one ground track.

Figure 6:
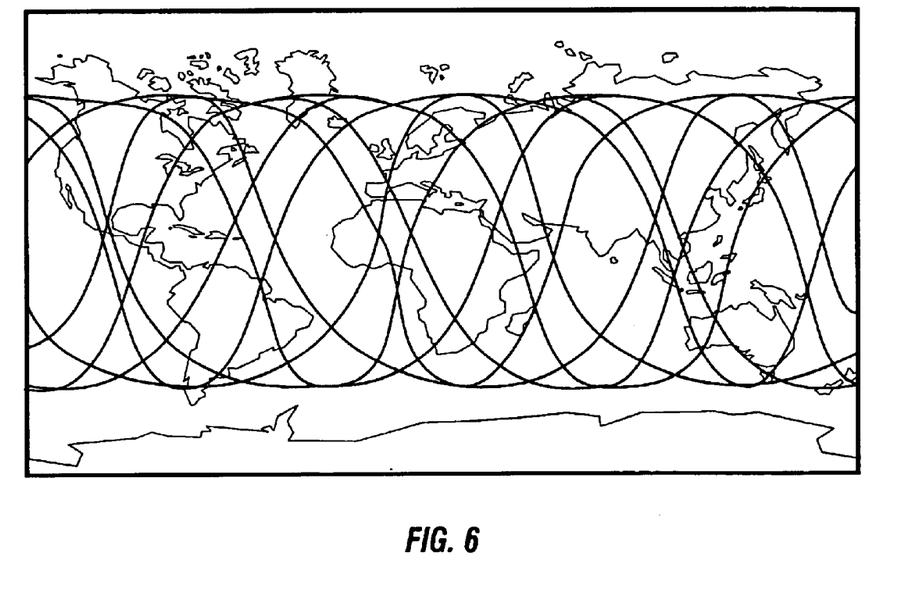
FIG. 6 shows a configuration with four ground tracks.
Figure 7:
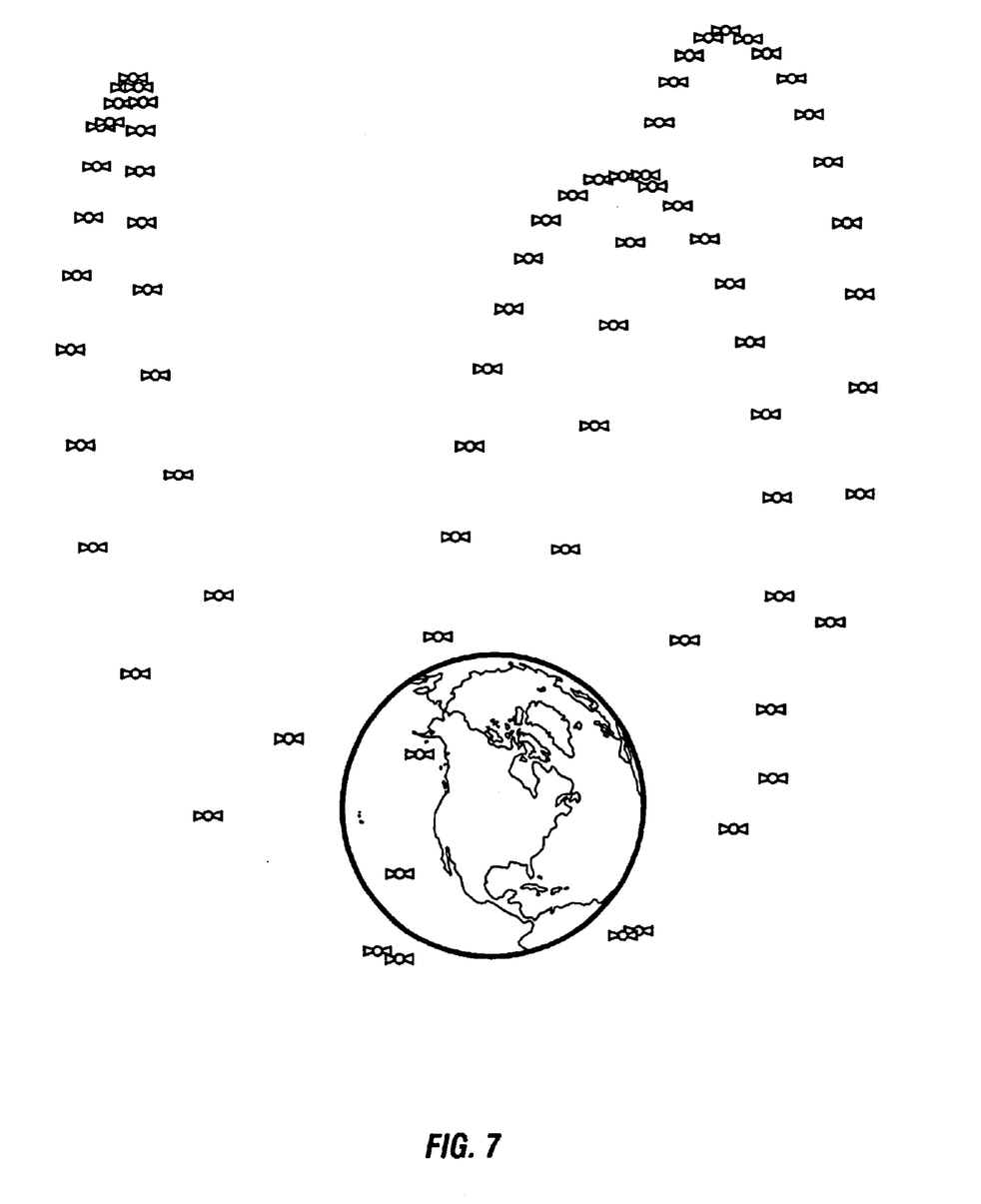
FIG. 7 shows the satellites in one of the ground tracks of the FIG. 6 embodiment.

FIG. 6 illustrates a possible configuration of four ground tracks over the earth. FIG. 7 shows 72 satellites placed in just one of the above ground tracks.

Figure 8:
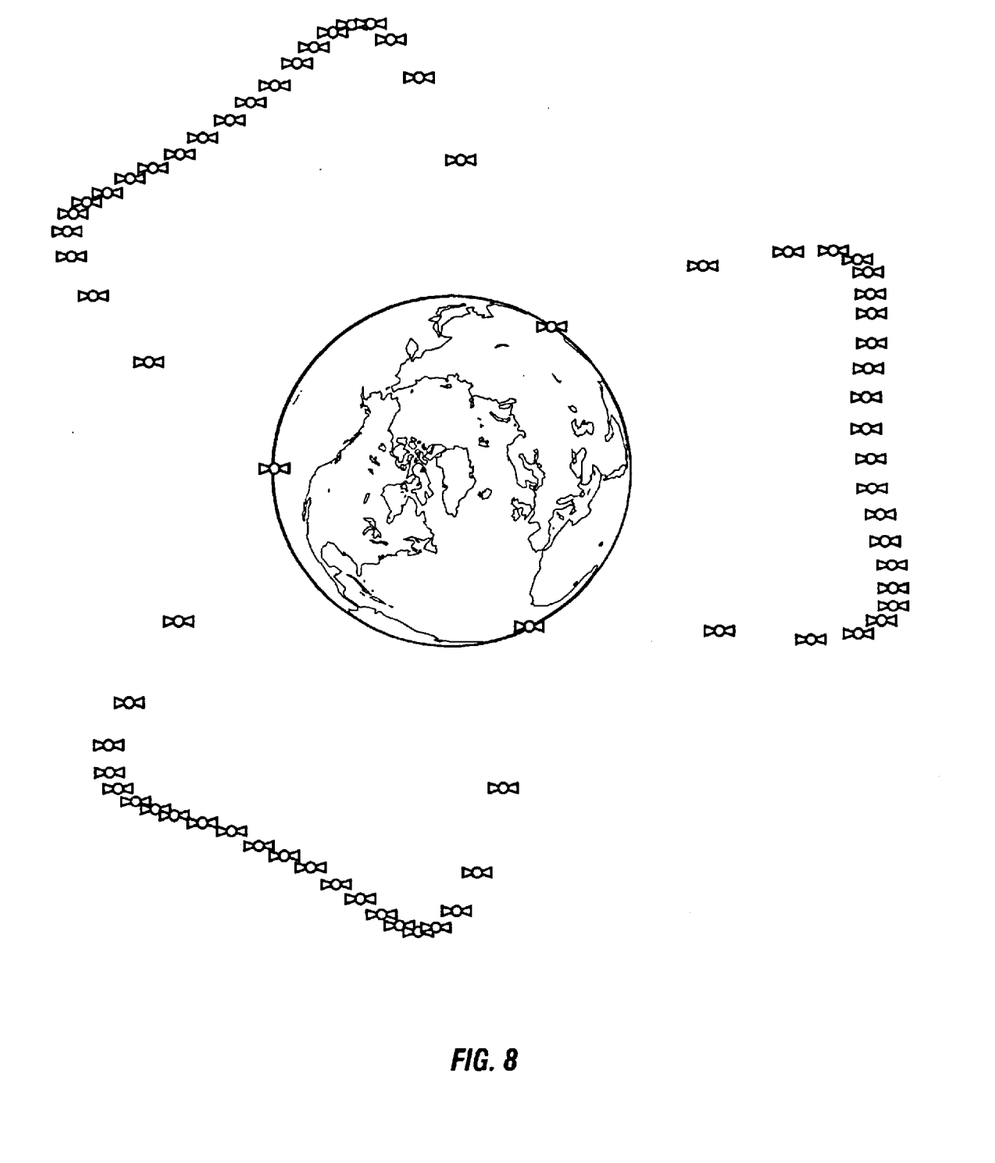
FIG. 8 shows the FIG. 7 (single ground track) satellites from a hypothetical north view, showing the virtually geostationary area.
Figure 9:
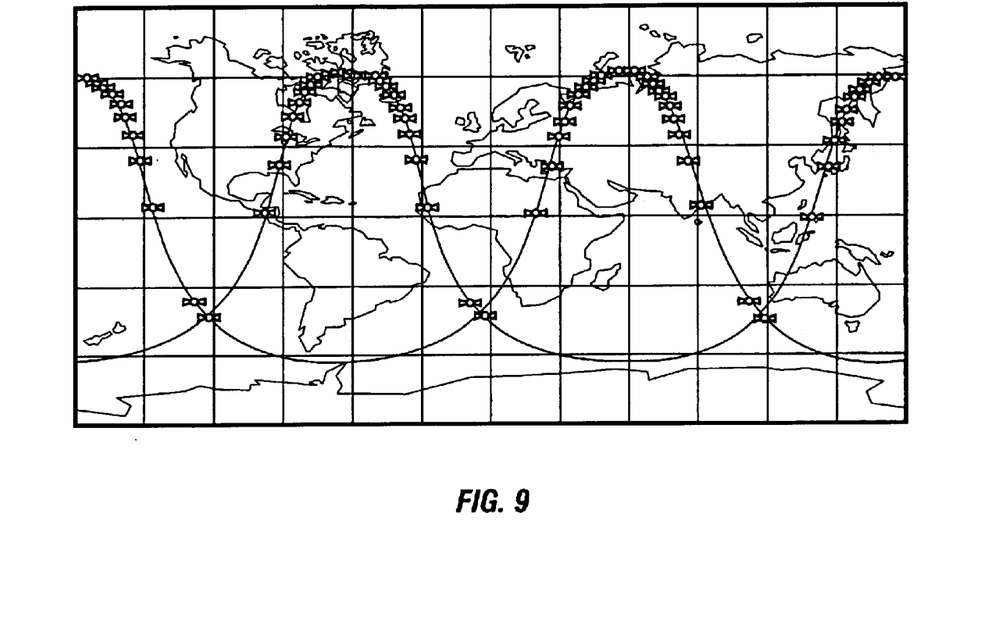
FIG. 9 shows the ground tracks of the satellites of FIGS. 7 and 8.

FIG. 8 shows the same 72 satellites seen from the North, effectively, the FIG. 7 view, from the north. Satellites follow behind each other in the paths illustrated in these figures, while maintaining a separation of at least two degrees earth central angle from all other satellites. The active portion of the ground track occurs in the higher, flattened portion 800 of the satellite paths shown in FIG. 8. These portions, or "petals" in this view, are geo-synchronous creating a "virtual geostationary" arrangement for placing earth communicating satellites. FIG. 9 shows the satellites of FIGS. 7 and 8 in their ground track.

If the satellites are spaced so as to maintain at least, for example, two-degree intervals at apogee within the active arc, on the order of 72 satellites can be placed in each ground track, comprising 15 in each of three active arcs and 9 in transit between active arcs in each ground track. Each satellite travels in its own orbit, as shown in FIG. 4. The 72 similar orbits differ only by their RAAN and mean anomaly (MA), whereby in this example the RAAN of the orbit of each immediately following satellite in the ground track is increased by 5 degrees over that of the preceding satellite and its mean anomaly adjusted to be 15 degrees less than the preceding satellite.

Figure 10:
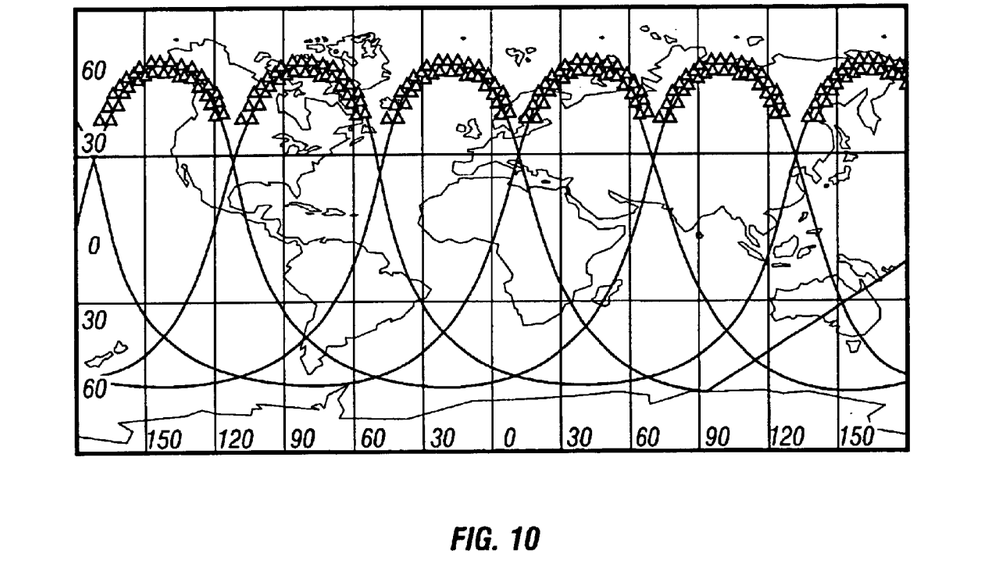
FIG. 10 shows illustrates active arcs occupied with satellites placed at an approximate 2-degree spacing.

Since this embodiment uses four ground tracks, each with three active arcs, this embodiment can accommodate 4 ground tracks•15 satellites per active arc•3 active arcs per ground track=180 active arc satellite slots. FIG. 10 illustrates active arcs occupied with satellites placed at an approximate 2-degree spacing.

In this embodiment, the apogee of the satellites lies at around 27,000 kilometers above the surface of the earth, or around three-quarters the altitude of satellites in the geostationary orbit. The lower 27,000 kilometer apogee altitude of this embodiment leads to savings in satellite costs, since the shorter path to and from the satellite yields less path loss, on the order of 60 percent or less than that of a geostationary satellite. The consequent reduced power requirements for a given link translate into savings in satellite weight and cost for a given capability. In addition, the orbit used in this preferred implementation requires less than half the launch energy required for launch into the geostationary orbit, yielding additional savings. These savings offset the costs of satellite time spent outside of active arcs.

FIG. 1 shows a 40 degree separation between the active arcs and the Geo band. However, other degrees of separations can also be used, simply by setting the amount of time or length of active arc of communicating with the satellites.

Different numbers of satellites may be used, as described herein. In an embodiment, the satellites form two different ground tracks in each of the Hemispheres. Each of the ground tracks has three distinct active arcs. FIG. 2 shows two ground tracks in the Northern Hemisphere, with six active arcs, and a single ground track in the Southern Hemisphere, and the 3 active arcs of that single ground track. In the embodiment of FIG. 2, there are 3 other ground tracks. This includes one ground track for the Northern Hemisphere and two for the Southern Hemisphere. These ground tracks can be populated by satellites. In this embodiment, the peak of the active arcs, or apogees, is at 63.4 degrees latitude.

One advantage of this system is that this may avoid interference between the virtual geo satellites, and the geo ring of satellites. The disclosed system may have more than 40 degrees of separation between the satellites and the geo ring.

Other modifications of these parameters can of course be used. While the above has described the peak of the active arcs being at 63.4 degrees, the minimum latitude for the active portions of the active arcs is about 45.1 degrees latitude, on either side of the apogee. Anything greater than that, and specifically, anything greater than 50 degrees latitude, may be preferred.

The mean anomaly spacing to ensure 2 degrees of satellites separation near apogee is 1080/72 or 15 degrees. Each daily ground track covers 3×360 degrees or 1080 degrees. Therefore, there can be 72 satellites per ground track. With 4 possible ground tracks, this can produce an effective possibility of 288 slots, using the 15 degree mean anomaly spacing. Each arc therefore may have 72/3=24 satellites. Between 4 and 5 satellites out of the 24 within each active arc is in active duty at any one time. Conversely, between 19 out of those 24 stay in standby mode in each loop at any time.

While 288 satellites may be the maximum theoretical numbers, 280 satellites total, or 70 per ground track, provides 14 satellites per active arc rather than 14 and a fraction. This may avoid phasing problems between different users that might otherwise occur. This provides a mean anomaly spacing of 1080 degrees divided by 70 equals 15.428 degrees and about 2.06 degrees width slots at apogee.

Up to 14 independent systems can use the fourteen slowly moving, active, satellites in each active arc. This may provide a total of 42 slots for the three active arcs in each one ground track. With 70 satellites in a single ground track, continuous coverage may be provided underneath all three active arcs. If D only a single ground track is used, then there may be a triangular outage region along the equator, midway between peaks of the active arcs, jumping to about 20 degrees of latitude. However, the second ground track provides continuous coverage of the entire Hemisphere including all the equatorial regions.

This system may have multiple advantages. By making the satellites active during only part of their orbits, the satellites create no interference with each other or with the geosatellites. The satellites are also much lower in altitude than the geo satellites. Hence latency may be better than geos, the satellites may be smaller, less expensive, require a smaller antenna, are less expensive to launch and allow more frequency reuse.

The apogees at the active arcs may be placed at specific longitudes to concentrate the capacity over land masses. These satellites may use primarily Ku and C bands, but may also use the Ka Band.

Although only a few embodiments have been disclosed in detail above, other modifications are possible.

All such modifications are intended to be encompassed within the following claims, in which:

What is claimed is:

1. A method, comprising:
   causing a plurality of satellites to orbit the earth in an elliptical orbit in one of n common ground tracks that causes an integer number of orbits of the earth per each day and each of which orbit has an apogee over a specified point on the earth; and
   causing said plurality of satellites to communicate with communication equipment on the earth only during the time when they are within an active arc near apogee, and causing each of said plurality of satellites to be inactive during times other then when they are in said active arc, wherein said causing comprises forming ground tracks such that the same number of satellites is always within said active arcs.

2. A method as in claim 1, further comprising causing satellite in a first ground track to communicate with a first ground system on the earth, and causing a second satellite in said first around track to communicate with a different second system on the earth.

3. A method as in claim 1, wherein said communicating comprises communicating only with each satellite for a specified time of the orbit, within 30 to 80% of its time in orbit.

4. A method as in claim 1, wherein said communicating comprises communicating only with each satellite for substantially 60 percent of its time in orbit.

5. A method as in claim 1, further comprising maintaining a specified degree of separation of satellites at a position of said satellites which has minimum separation.

6. A method as in claim 5, wherein said position of said minimum degree of separation is at apogee.

7. A method as in claim 5, wherein said minimum degree of separation is substantially two degrees of separation.

8. A method as in claim 1, wherein said communicating comprises avoiding communicating with said satellites during a position of said satellites that is within a specified interval near other satellites.

9. A method as in claim 8, wherein said other satellites are geosynchronous satellites.

10. A method as in claim 8, wherein said specified interval is substantially 40 degrees.

11. A method, comprising:
    causing a plurality of satellites to orbit the earth in elliptical orbits, forming repeating ground tracks, with a plurality of satellites in each ground track;
    defining an active arc within each ground track, which has a specified number of satellites within the active arc at any time; and
    communicating with said satellites only during the time when said satellites are within said active arc, wherein a specified degree of separation between satellites is substantially 40 degrees.

12. A method as in claim 11, wherein said defining comprises defining an active arc which has a specified degree of separation from a line of communication to geosynchronous satellites.

13. A method as in claim 11, wherein the specified number of satellites is greater than one.

14. A method as in claim 11, wherein there are satellites in ground tracks having apogees in the Northern Hemisphere, and separate satellites in ground tracks having apogees in the Southern Hemisphere.

15. A method as in claim 11, wherein said specified number of satellites within the active arc is at all times, the same integer number of satellites.

16. A method as in claim 15, said causing comprises causing each of the plurality of satellites to orbit in a specified orbit whereby as a first satellite leaves the active arc, another satellite enters the active arc.

17. A method as in claim 11, wherein said causing comprises establishing a predetermined minimum degree of separation between satellites.

18. A method as in claim 17, wherein said minimum degree of separation is substantially two degrees of separation.

19. A method as in claim 11, wherein said ground tracks are placed in a way that is effective is to avoid outages in coverage on the earth.

20. A method as in claim 11, wherein said satellite orbits at all points are below 22,300 miles of altitude.

21. A method as in claim 11, wherein said satellites orbit in an inclined elliptical orbit.

22. A method as in claim 21, wherein said inclined elliptical orbit is inclined substantially at 63.4 degrees.

23. A method, comprising:

causing a plurality of satellites to orbit the earth in an inclined elliptical orbit with apogees below 22,300 miles and to pass into a first area where the satellites may interfere with communication wilt geosynchronous satellites, and a second area where the satellites could not interfere with communication with geosynchronous satellites, said plurality of satellites including a first plurality of satellites orbiting in a first common ground track that repeats an integer number of times per day, and a second plurality of satellites orbiting in a second common ground track, different from said first common ground track, and which also repeats an integer number of times per day; and communicating with said plurality of satellites only during a time when they are not in said first area, wherein said second area is defined as an area with a specified degree of separation from possible interference, wherein said specified degree of separation is substantially 40 degrees.

24. A method as in claim 23, wherein said communicating comprises communicating with said satellites during substantially 60 percent of their time within their orbit.

* * * * *